United States Patent
Chang

(10) Patent No.: US 10,547,894 B2
(45) Date of Patent: Jan. 28, 2020

(54) VIDEO STREAMING SYNCHRONIZATION SWITCHING METHOD FOR VIDEO WALL SYSTEM

(71) Applicant: ATEN International Co., Ltd., New Taipei (TW)

(72) Inventor: Yung-Yi Chang, New Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 0 days.

(21) Appl. No.: 16/211,717

(22) Filed: Dec. 6, 2018

(65) Prior Publication Data

US 2019/0182535 A1 Jun. 13, 2019

(30) Foreign Application Priority Data

Dec. 7, 2017 (TW) .............................. 106143027 A

(51) Int. Cl.
*H04N 5/04* (2006.01)
*H04N 5/268* (2006.01)
(Continued)

(52) U.S. Cl.
CPC ....... *H04N 21/4307* (2013.01); *G06F 3/1446* (2013.01); *G09G 5/12* (2013.01); *H04N 21/4384* (2013.01); *G09G 2300/026* (2013.01)

(58) Field of Classification Search
CPC ........... H04N 21/2368; H04N 21/4384; H04N 21/4307; H04N 21/4341; H04N 21/4305;
(Continued)

(56) References Cited

U.S. PATENT DOCUMENTS 6,393,196 B1 * 5/2002 Yamane ................ G06F 17/211
386/281
2009/0278985 A1 11/2009 Chan
2014/0306966 A1 10/2014 Kuo et al.

FOREIGN PATENT DOCUMENTS

| CN | 106331530 A | 1/2017 |
| TW | 200948046 A | 11/2009 |
| TW | I523516 B | 2/2016 |

OTHER PUBLICATIONS

Taiwanese Office Action, dated Dec. 5, 2018, in a counterpart Taiwanese patent application, No. TW 106143027.

* cited by examiner

*Primary Examiner* — Sherrie Hsia
(74) *Attorney, Agent, or Firm* — Chen Yoshimura LLP

(57) ABSTRACT

A synchronized video stream switching method for a video wall system. The video wall system includes a transmitter having first and second channels, and a receiver having third and fourth channels. The method includes: (a) After receiving a control command, the transmitter uses the first channel to transmit the first video stream to the third channel, and uses the second channel to transmit a pre-switch command to the fourth channel. (b) After receiving the pre-switch command, the receiver preserves the first video stream in the third channel. (c) After the switching event occurs at the transmitter in response to the control command, the transmitter transmit the second video stream via the first channel, but the receiver continues to preserve the first video stream in the third channel within a predetermined time period. (d) After the predetermined time period, the receiver accepts the second video stream in the third channel.

20 Claims, 3 Drawing Sheets

(51) Int. Cl.
    *H04N 9/475*           (2006.01)
    *H04N 21/43*           (2011.01)
    *H04N 21/438*         (2011.01)
    *G09G 5/12*            (2006.01)
    *G06F 3/14*            (2006.01)

(58) Field of Classification Search
    CPC   H04N 5/268; H04N 5/04; H04N 5/06; H04N
                          5/4401; H04N 5/775; G06F 3/1446;
                          G09G 5/12; G09G 2300/026
    USPC  ........ 348/515, 512, 500, 705, 706; 375/354
    See application file for complete search history.

VIDEO STREAMING SYNCHRONIZATION SWITCHING METHOD FOR VIDEO WALL SYSTEM

BACKGROUND OF THE INVENTION

Field of the Invention

The present invention is related to an application method in video stream switching for video wall systems. In particular, it is related to a synchronized switching method in video streaming for video wall systems.

Description of Related Art

The video wall system is often used as a large size display application for advertising board or outdoor broadcasting. The video wall system usually comprises multiple display devices and multiple video switches; each video switch controls at least one display device; each display device plays the required video stream under the control and switching of a video switch. However, when it is necessary to switch a video stream, it is not possible for the conventional video and audio switch to know in advance when a switching event will occur and the precise switching time. Therefore, when a switching event of video stream occurs, the different video switch may switch at different time caused by the hardware characteristics or software operating speeds; this in turn causes an unstable display or a signal interruption, and the unsmooth display will adversely affect the watching experience.

SUMMARY

Hence, to solve the problem mentioned above of unstable display or signal interruption caused by switching, an embodiment of the present invention provides a synchronized switching method of video streams for video wall systems. The video wall systems includes a transmitter and a receiver; the transmitter has first and second channels, and the receiver has third and fourth channels. The method includes the following steps: (a) After a control command is transmitted to the transmitter, the transmitter uses the first channel to transmit the first video stream to the third channel, and uses the second channel to transmit a pre-switch command to the fourth channel. (b) After the receiver receives the pre-switch command in the fourth channel, the receiver preserves the first video stream in the third channel. (c) After the switching event occurs at the transmitter in response to the control command, the transmitter transmit the second video stream via the first channel, but the receiver continues to preserve the first video stream in the third channel within a predetermined time period. (d) After the predetermined time period, the receiver accepts the second video stream in the third channel.

According to the embodiment of the method for synchronously switching video streams of the present invention, the receiver accepts the second video stream after a predetermined time period according to the pre-switch command. Within the predetermined time period, the receiver also completes the adjustment of display settings required for port switching based on the pre-switch command. Therefore after the predetermined time period, the receiver can display images according to the second video stream. In addition, in embodiments where there are multiple receivers at the same time, since multiple receivers receive the pre-switch command synchronously, and accept the second video stream after the same predetermined time period, the multiple receivers can synchronously display the second video stream, thereby effectively preventing the picture from being unstable or the signal being interrupted.

To achieve clearer and easier understanding of the above and other purposes, features, and benefits of the present invention, the preferred embodiments are described in detail below with reference to the attached drawings.

DETAILED DESCRIPTION OF PREFERRED EMBODIMENTS

The synchronized switching method for video stream of the embodiments of the present invention will be described below with reference to FIG. 1, FIG. 2, and FIG. 3.

Figure 1:
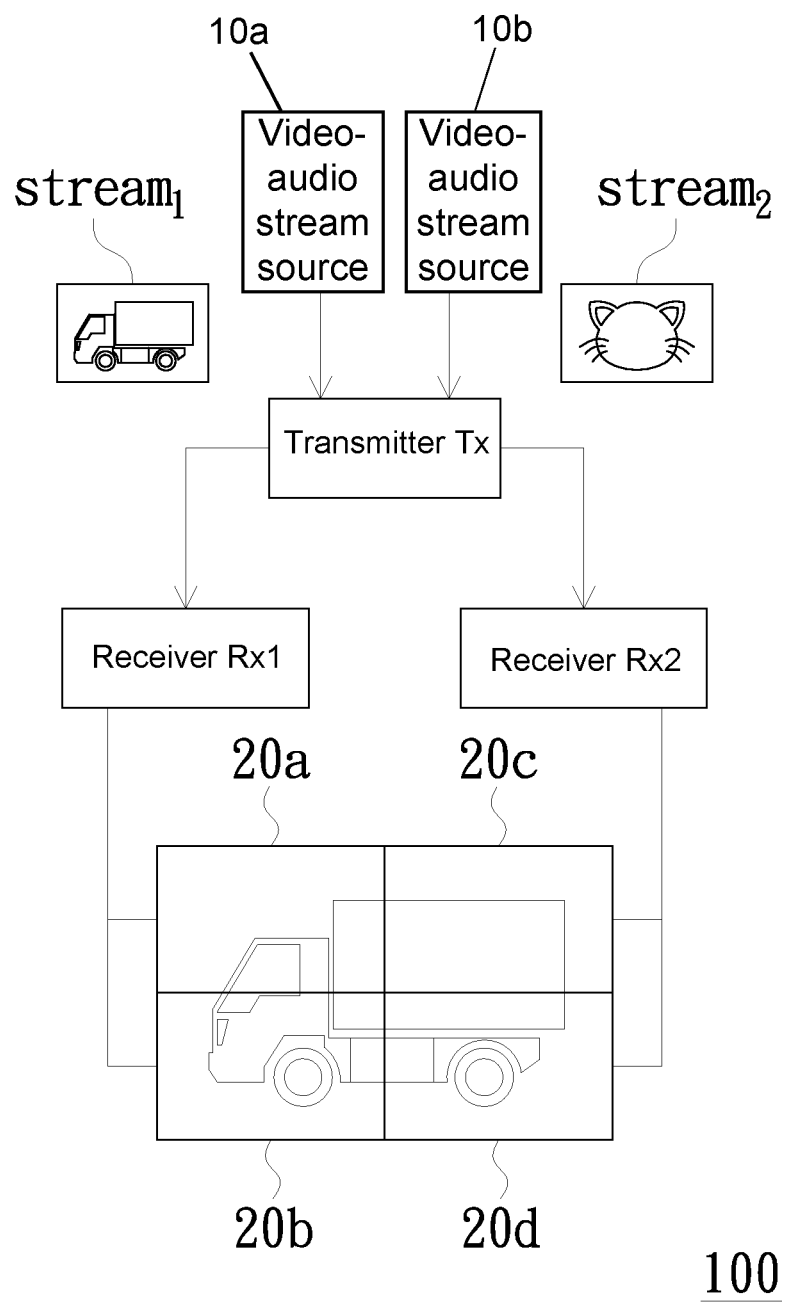
FIG. 1 is a schematic diagram of a video wall system according to an embodiment of the present invention.

First, FIG. 1 is a schematic diagram of a video wall system of an embodiment of the present invention. As shown in FIG. 1, the video wall system 100 includes multiple video-audio stream sources 10, a transmitter Tx, multiple receivers Rx, and multiple displays 20. The video-audio stream source 10 is used to provide a video-audio stream to the transmitter Tx. In this embodiment, taking the video wall system 100 including the video-audio stream sources 10a and 10b as an example, they provide different video-audio streams. As shown in FIG. 1, the video-audio stream source 10a provides the video-audio stream stream1, and the video-audio stream source 10b provides the video-audio stream stream2. The transmitter Tx is configured to receive a plurality of video-audio streams provided by the video-audio stream source 10, and transmits the video-audio stream that is currently intended to be output to the receiver Rx. As an example in FIG. 1, the transmitter Tx transmits the received video-audio stream stream1 to the receiver Rx. The receiver Rx is configured to receive the video-audio stream from the transmitter Tx, and plays the video-audio stream according to the resolution of the video-audio stream and the position of the displays 20. In this embodiment, taking the video wall system 100 including the receivers Rx1 and Rx2 as an example, the receiver Rx1 is configured to control the display 20a and the display 20b, and the receiver Rx2 is configured to control the display 20c and the display 20d. The displays 20a, 20b, 20c and 20d are configured to individually display a quarter frame for each image frame in the video stream. A matrix video switch can be used to implement each transmitter end and receiver, but the present invention is not limited to such implementations.

Figure 2:
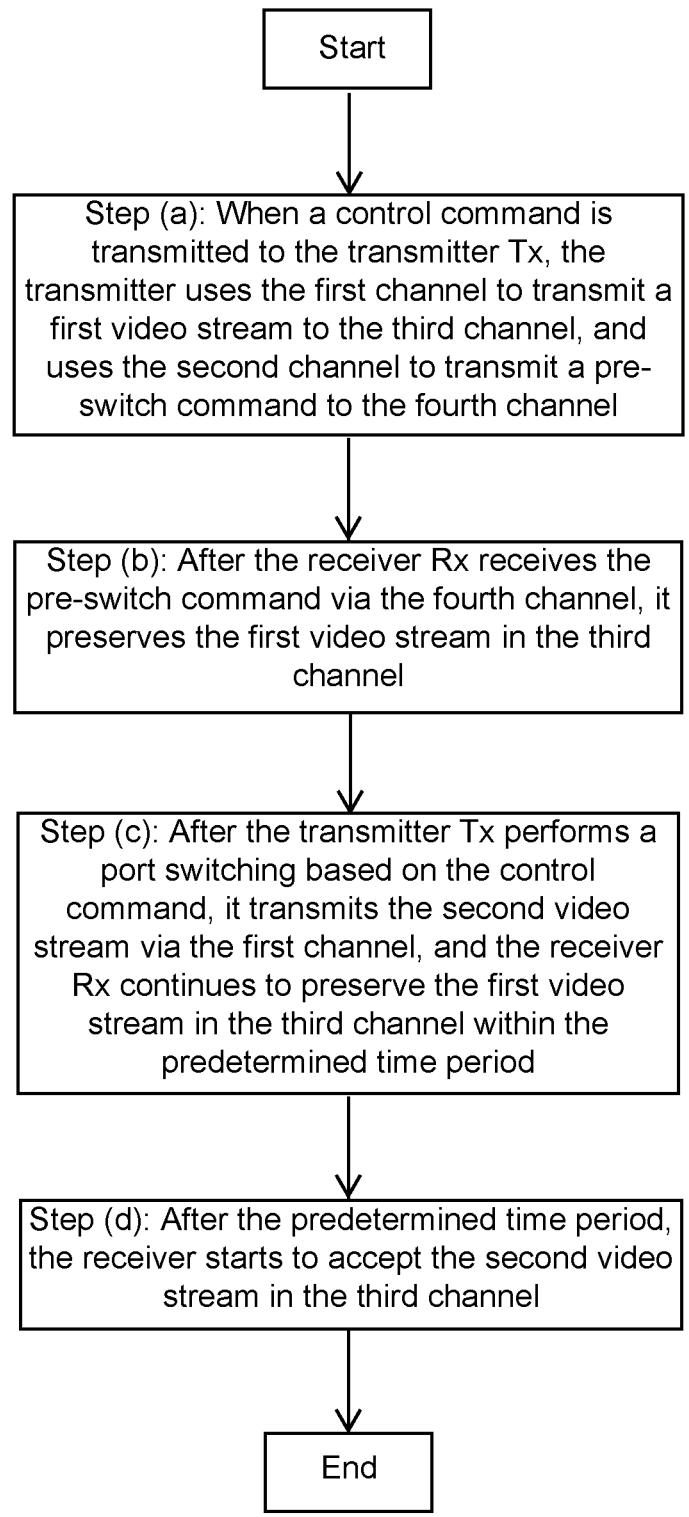
FIG. 2 is a flow diagram of a synchronized switching method for video streaming according to an embodiment of the present invention.

Refer to FIG. 2, which illustrates a synchronized switching method for video streaming according to an embodiment of the present invention. Take the example of one transmitter Tx and one receiver Rx, the transmitter Tx includes a first channel and a second channel, and the receiver Rx includes a third channel and a fourth channel. The first channel and the third channel are video transmission channels, and the second channel and the fourth channel are audio transmission channels. In step (a), in response to receiving a control command, the transmitter uses the first channel to transmit a first video stream to the third channel, and uses the second channel to transmit a pre-switch command to the fourth channel. The first video stream may be, for example, the video stream stream1 described earlier. The transmitter Tx may, for example, receive the control command via a port switch selection key that is enabled, and in response thereto, use the second channel to transmit the pre-switch command to the fourth channel. The pre-switch command includes video processing command and information regarding a predetermined time period. The video processing commands include at least one of image zooming parameters, image composition parameters, image division parameters, and image distribution parameters. Thus, the receiver Rx can adjust the display settings based on the pre-switch commands, so as to prepare the video-audio streams after switching. In step (b), after the receiver Rx receives the pre-switch command via the fourth channel, it preserves the first video stream in the third channel. In step (c), after the transmitter Tx performs a port switching based on the control command, it transmits the second video stream via the first channel, such as the video stream stream2 described earlier, but the receiver Rx continues to preserve the first video stream in the third channel within the predetermined time period. The first video stream includes at least one frame of image; the receiver temporarily stores and then continuously outputs the frame, so as to preserve the first video stream in the third channel. For example, the one frame may be the frame that is being outputted by the receiver at the time the receiver Rx receives the pre-switch command. The predetermined time period may be, for example, the display time of one frame of video; further, the predetermined time period is longer than or equal to a video processing time that is required for the receiver Rx to perform switching of the video-audio stream. However, the invention is not limited to such examples. In step (d), after the predetermined time period, the receiver starts to accept the second video stream in the third channel.

In other embodiments, step (a) further includes the transmitter interrupting data transmission in the second channel after transmitting the pre-switch command. Step (b) further includes the receiver interrupting data reception in the fourth channel in response to the data transmission being interrupted in the second channel. Step (c) further includes, when the port switching event occurs in the transmitter, the receiver continuing to interrupt the data transmission in the fourth channel. Step (d) further includes the receiver resuming receiving the data reception in the fourth channel after the predetermined time period. In some other embodiments, when the second channel transmits the pre-switch command and the data transmission in the second channel is interrupted, the receiver Rx starts to preserve the first video stream in the third channel. The reason is that, if a pre-switch command alone is used to control the action of the receiver Rx, then in case certain audio commands in the audio transmission channels (the second and fourth channels in this embodiment), by coincidence, have an identical form as the pre-switch command, a mistake could happen such that even though no switching related control command was send to the receiver Rx, but the receiver Rx mistakenly interprets some audio command as a port switching event and starts to preserve the same frame as the output to the display. Therefore, in this embodiment, the interruption of the data transmission in the audio transmission channel is used as a confirmation that indeed a switching related control command was transmitted by the transmitter, such that the receiver Rx will only start to preserve the same frame output for the display when it both receives the pre-switch command and detects the subsequent interruption of the audio signal. However, the invention is not limited to this; rather, if it can be assured that the form of the pre-switch command is not identical to any command of the audio transmission, the interruption of the data transmission in the audio channel is not required but is only optional.

Figure 3:
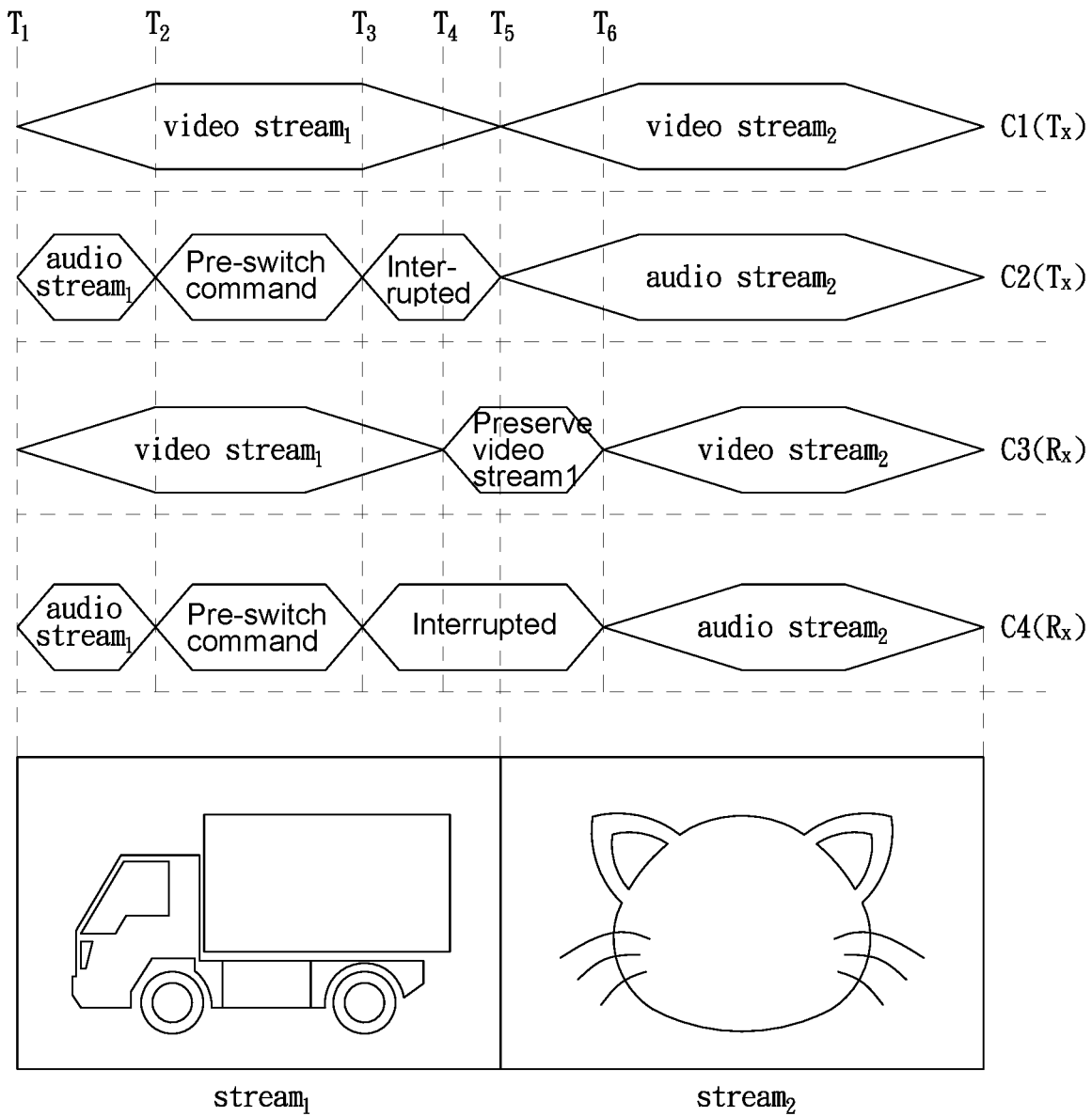
FIG. 3 is a timing diagram of a synchronized switching method for video streaming according to an embodiment of the present invention.

FIG. 3 further illustrates the synchronized switching method for video streaming according to the embodiment of the present invention. Referring to FIGS. 1, 2 and 3, and taking as an example of switching from a first video-audio stream (stream1) to a second video-audio stream (stream2). Each video-audio stream includes a video stream and an audio stream. Between time points T1 and T2, the first channel C1 of the transmitter Tx transmits the first video stream (video stream1) to the third channel C3 of the receiver Rx, and the second channel C2 of the transmitter Tx transmits the first audio stream (audio stream1) to the fourth channel C4 of the receiver Rx. Between time points T2 and T3, the transmitter Tx receives the control command, and the first channel C1 of the transmitter Tx continues to transmit the first video stream (video stream1) to the third channel C3 of the receiver Rx; but in response to receiving the control command, the second channel C2 of the transmitter Tx transmits the pre-switch command to the fourth channel C4 of the receiver Rx. Between time points T3 and T4, the first channel C1 of the transmitter Tx continues to transmit the first video stream (video stream1) to the third channel C3 of the receiver Rx, but the second channel C2 of the transmitter Tx interrupts the data transmission in that channel, and the second channel C4 of the received Rx correspondingly interrupts its data reception. Between time points T4 and T5, the first channel C1 of the transmitter Tx continues to transmit the first video stream (video stream1) to the third channel C3 of the receiver Rx; and in response to receiving the pre-switch signal and the subsequent interruption of the data transmission in the fourth channel C4, the receiver Rx starts to preserve the first video stream (video stream1) in the third channel C3 (i.e. it starts to continuously and repeatedly transmit the same frame of the first video stream, video stream1), and the second channel C2 of the transmitter Tx and the second channel C4 of the received Rx continue to interrupt the data transmission and reception. At time point T5, port switching occurs at the transmitter, such that the first channel C1 of the transmitter Tx starts to transmit the second video stream (video stream2) to the third channel C3 of the receiver Rx, and the second channel C2 of the transmitter Tx starts to transmit the second audio stream (audio stream2) to the fourth channel C4 of the receiver Rx. However, between time points T5 and T6, the third channel C3 of the receiver Rx continues to preserve the previous video stream (i.e. it continues to repeatedly transmit the same image frame of the first video stream, video stream1), and the fourth channel C4 of the receiver Rx remains interrupted. In other words, during this time period, although the new video and audio streams are available from the transmitter, the receiver does not display them. At time point T6, the third channel C3 of the receiver Rx terminates the preserved previous video stream (video stream1) and starts to accept the second video stream (video stream2), and the fourth channel C4 of the receiver Rx terminates the interruption and starts to accept the second audio stream (audio stream2). Here, the term "accept" is used to indicate that the receiver is now using the new video and audio streams for display. As mentioned earlier, between time points T5 and T6, the new video and audio streams are in fact available from the transmitter, but the receiver was not use them for display yet, i.e. the receiver did not "accept" the new video and audio streams. In this example, the time period between time points T4 and T6 is the predetermined time period. In some alternative embodiments, the predetermined time period can be the time period between time points T3 and T6 (i.e., when the pre-switch signal is not coincidentally identical to any command of the audio signal and so the interruption of the audio steam is not used as a confirmation of the pre-switch command). Thus, embodiments of the present invention control the timing of when the receiver Rx accepts the second video stream (video stream2) and the second audio stream (audio stream2) by using the technique of having the third channel C3 of the receiver Rx preserve a single video frame of ore previous video stream during the predetermined time period, and in some embodiment also using the technique of maintaining an interruption in the fourth channel C4 of the receiver Rx. As a result, when multiple receivers Rx perform switching of video-audio streaming, the techniques can ensure that the multiple receivers Rx start to output the new video stream (video stream2) at the same time (such as the time point T6 in FIG. 3). This achieves the effect of synchronized display of the multiple display devices controlled by the multiple receivers Rx.

It should be noted that in the above embodiments, in practice, the data steams in the second channel C2 and fourth channel C4 (audio stream1 and audio stream2) are not limited to audio streams. Rather, based on the descriptions herein, those skilled in the art can alternatively use another non-video streaming channel to replace the audio streaming channel in order to transmit the pre-switch command, to achieve the above-described synchronized display effect.

In summary, the synchronized video stream switching method according to embodiments of the present invention can effectively synchronize multiple receivers Rx, and avoid unstable display of the image or interruption of the display. Further, the synchronized video stream switching method according to embodiments of the present invention can be implemented in existing TV wall systems without requiring additional control devices; this effectively reduces cost and promotes its applicability in industry.

The transmitter Tx and multiple receivers Rx described above may be implemented in electrical circuitry including integrated circuits and/or computer executable program code stored in computer readable non-volatile memories.

It will be apparent to those skilled in the art that various modification and variations can be made in the synchronized video stream switching method and related apparatus of the present invention without departing from the spirit or scope of the invention. For example, another non-video channel may be used to replace the audio channel for purpose of transmitting the pre-switch command. Thus, it is intended that the present invention cover modifications and variations that come within the scope of the appended claims and their equivalents.

What is claimed is:

1. A synchronized video stream switching method, implemented in a system which includes a transmitter and a receiver, the transmitter including a first channel and a second channel and the receiver including a third channel and a fourth channel, the method comprising:
   (a) in response to receiving a control command, using the first channel to transmit a first video stream to the third channel, and using the second channel to transmit a pre-switch command to the fourth channel, by the transmitter;
   (b) after receiving the pre-switch command via the fourth channel, preserving the first video stream in the third channel by the receiver;
   (c) performing a port switching based on the control command and transmitting a second video stream via the first channel by the transmitter, and continuing to preserve the first video stream in the third channel within a predetermined time period by the receiver; and
   (d) after the predetermined time period, accepting the second video stream in the third channel by the receiver.

2. The synchronized video stream switching method of claim 1, wherein
   step (a) further includes interrupting data transmission in the second channel by the transmitter after transmitting the pre-switch command;
   step (b) further includes interrupting data reception in the fourth channel by the receiver in response to the data transmission being interrupted in the second channel;
   step (c) further includes, when performing the port switching by the transmitter, continuing to interrupt data reception in the fourth channel by the receiver; and
   step (d) further includes resuming data reception in the fourth channel by the receiver after the predetermined time period.

3. The synchronized video stream switching method of claim 2, wherein the preserving of the first video stream in the third channel is performed by the receiver starting after receiving the pre-switch command via the second channel and after the data transmission is interrupted in the second channel.

4. The synchronized video stream switching method of claim 1, wherein the first video stream includes at least one frame of image, and wherein the preserving of the first video stream in the third channel is performed by the receiver by temporarily storing the frame and then continuously outputting the frame.

5. The synchronized video stream switching method of claim 1, wherein the first channel and the third channel are video transmission channels, and the second channel and the fourth channel are audio transmission channels.

6. The synchronized video stream switching method of claim 1, wherein the pre-switch command includes a video processing command and information regarding the predetermined time period.

7. The synchronized video stream switching method of claim 6, wherein the video processing commands include at least one of image zooming parameters, image composition parameters, image division parameters, and image distribution parameters.

8. The synchronized video stream switching method of claim 1, wherein the first video stream includes at least one frame of image, and wherein the step of continuing to preserve the first video stream in the third channel is performed by the receiver by continuously outputting the frame via the third channel during the predetermined time period.

9. The synchronized video stream switching method of claim 8, wherein the frame is a frame being outputted by the receiver at a time the pre-switch command is received by the receiver.

10. The synchronized video stream switching method of claim 1, further comprising adjusting display settings by the receiver based on the pre-switch command within the predetermined time period.

11. The synchronized video stream switching method of claim 10, wherein the predetermined time period is longer than or equal to a display time of one frame of video and longer than or equal to a video processing time required for the receiver to perform video stream switching.

12. The synchronized video stream switching method of claim 1, wherein the preserving of the first video stream in the third channel is performed by the receiver starting immediately after receiving the pre-switch command.

13. A synchronized video stream switching method implemented in a video transmitter which includes a first channel and a second channel, the method comprising:
- transmitting a first video stream via the first channel, and transmitting a first audio stream via the second channel;
- at a first time point, in response to receiving a control command, continuing to transmit the first video stream via the first channel, and transmitting a pre-switch command via the second channel;
- at a subsequent second time point, continuing to transmit the first video stream via the first channel, and interrupting data transmission in the second channel after transmitting the pre-switch command; and
- at a subsequent third time point, starting to transmit a second video stream via the first channel and to transmit a second audio stream via the second channel.

14. The synchronized video stream switching method of claim 13, wherein the pre-switch command includes video processing commands and information regarding a predetermined time period.

15. The synchronized video stream switching method of claim 14, wherein the video processing commands include at least one of image zooming parameters, image composition parameters, image division parameters, and image distribution parameters.

16. A synchronized video stream switching method implemented in a video receiver which includes a first channel and a second channel, the method comprising:
- receiving a first video stream in the first channel, and receiving a first audio stream in the second channel;
- at a first time point, receiving a pre-switch command in the second channel, the pre-switch command including information regarding a predetermined time period, and continuing to receive the first video stream in the first channel;
- at a subsequent second time point, detecting an interruption of data received in the second channel, and interrupting data reception in the second channel;
- at a subsequent third time point, in response to receiving the pre-switch command and detecting the interruption, starting to preserve the video stream in the first channel;
- continuing to preserve the first video stream in the first channel and continuing to interrupt data reception in the second channel within the predetermined time period; and
- after the predetermined time period, accepting a second video stream in the first channel and accepting a second audio stream in the second channel.

17. The synchronized video stream switching method of claim 16, wherein the first video stream includes at least one frame of image, and wherein preserving the first video stream in the third channel includes temporarily storing the frame and then continuously outputting the frame.

18. The synchronized video stream switching method of claim 17, wherein the frame is a frame being outputted by the receiver at a time the receiver receives the pre-switch command.

19. The synchronized video stream switching method of claim 16, wherein the pre-switch command further includes video processing commands, which include at least one of image zooming parameters, image composition parameters, image division parameters, and image distribution parameters.

20. The synchronized video stream switching method of claim 19, further comprising adjusting display settings based on the pre-switch command within the predetermined time period.

* * * * *